Nov. 14, 1950     A. P. DAVIS     2,530,154
STABLE VERTICAL ELEMENT

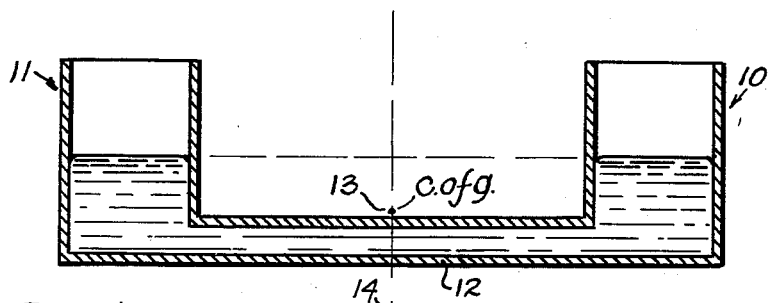
Fig. 1
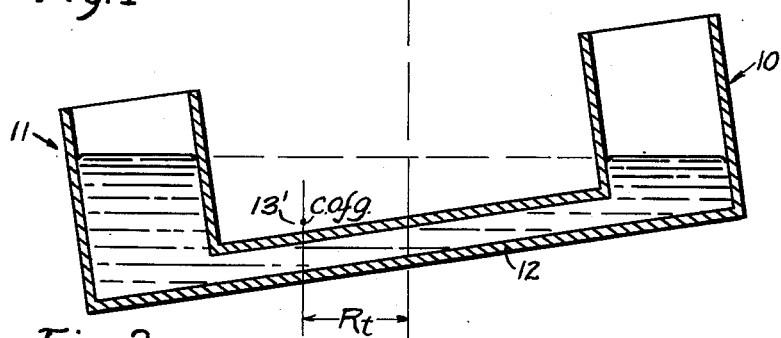
Fig. 2
Fig. 3
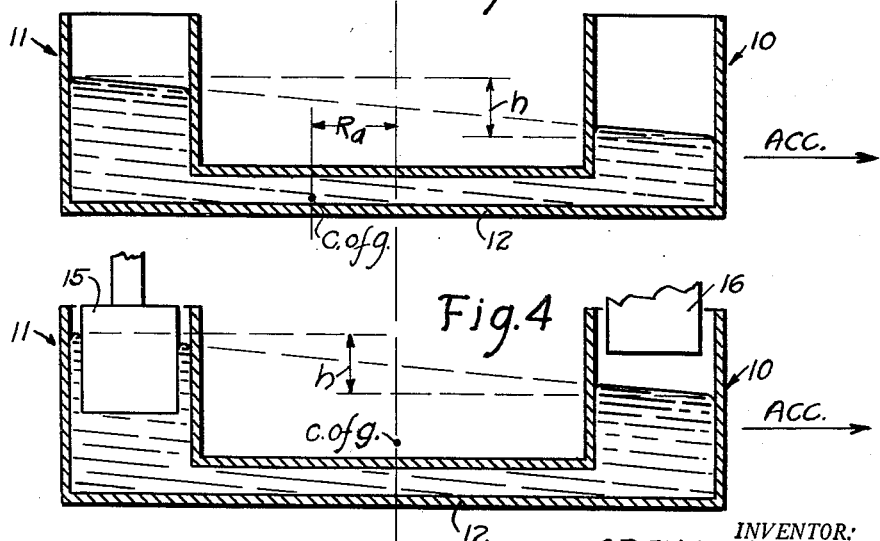
Fig. 4

Filed Sept. 28, 1945     3 Sheets-Sheet 2

INVENTOR.
ARTHUR P. DAVIS

BY *Campbell Brumbaugh, Free & Graves*
ATTORNEYS.

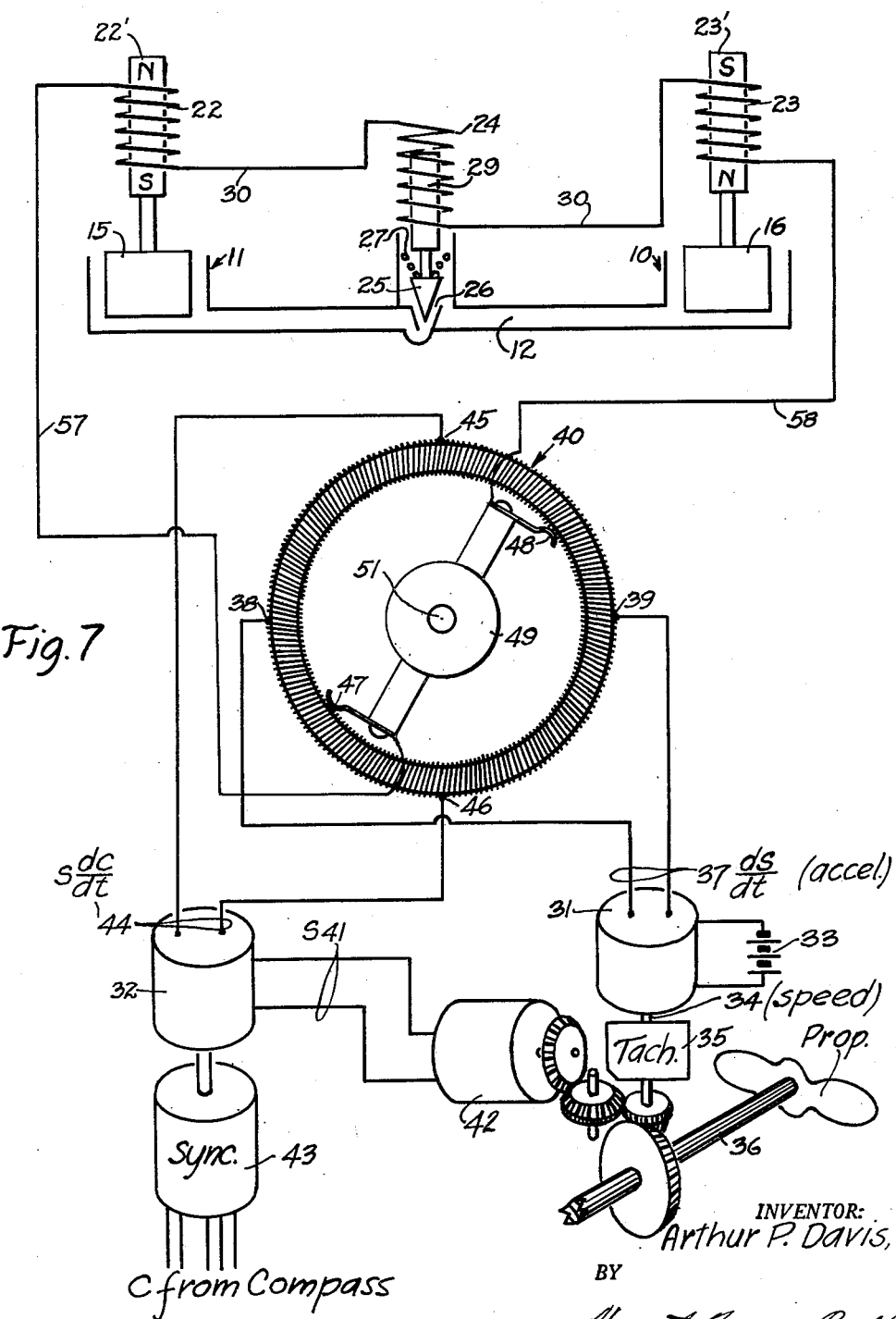

Patented Nov. 14, 1950

2,530,154

UNITED STATES PATENT OFFICE 2,530,154

STABLE VERTICAL ELEMENT

Arthur P. Davis, New York, N. Y., assignor to Arma Corporation, Brooklyn, N. Y., a corporation of New York Application September 28, 1945, Serial No. 619,224

20 Claims. (Cl. 74—5.44)

This invention relates to stable vertical elements and has particular reference to improvements in mercury ballistic erecting systems for such elements.

In naval shipboard instruments for indicating the vertical by gyroscopic action, controlled mercury flow has been found to be the most practical means of causing the gyroscope to precess back to the vertical when it departs therefrom. In the operation of such control systems, departure of the gyroscope from the vertical causes mercury to flow from one tank to another on the gyroscope case through a restricted pipe, thus producing a displaced fore-couple upon the gyroscope, causing it to precess back to the vertical. Mercury has been chosen for this purpose because of its weight per unit of volume and its low viscosity, causing quick response to gravity. However, these same properties of the mercury also cause it to be equally sensitive to disturbing forces, such as acceleration and, for this reason, it has been found expedient to block the mercury flow when acceleration is present. This expedient, which leaves the gyroscope without control when under acceleration during a small interval of time, was practical when gun-fire was limited to straight line sailing at uniform speed or on slow curves, but changed conditions of rapid maneuvering with frequent changes in course and speed in naval warfare have made continuous firing imperative under all conditions of travel. It has therefore become essential that control of the gyroscope be continuous and, as a consequence, the effect of acceleration on the system must be neutralized in so far as is practicably possible.

In certain stable elements using a mercury control system having two tanks mounted diametrically opposite each other on the case of the gyroscope wheel and interconnected by means of a pipe having a certain constriction, the gyroscope case together with the attached tank system is continuously rotated about a substantially vertical axis at a speed determined by the constants of the mercury system, so that resonance effects appear. The flow of the mercury lags, roughly, a quarter turn behind any tilt of the gyroscope from the vertical, and in this way a torque is produced on the gyroscope, when tilted, which is in the proper plane to precess it back to the vertical. The problem of shift of mercury caused by acceleration, however, has not been solved, but has been merely avoided by plugging the mercury flow pipe whenever acceleration was present, the gyroscope then being derelict and free to drift until the acceleration disappeared, so that during such periods the gun-fire control operations were deprived of a reliable reference upon which to base accurate calculations.

In accordance with the present invention, a mercury ballistic erecting system for a gyroscope stable element is provided, which keeps the gyroscope continuously under control of the mercury at all times, including periods of acceleration, by automatically making allowances for the same in a novel and effective manner. Inasmuch as the mercury must be free to respond to the slightest tilt of the system in order to correct any real deviation of the gyroscope, it necessarily is free to respond to acceleration forces also. Ordinarily, acceleration effects cause the mercury to flow and produce a head of mercury in one tank over that in the other, which unbalances the system with the result that a correction couple is imposed on the gyroscope for a departure from vertical which does not actually exist.

In order to prevent this false response and at the same time to allow correction for any tilt which does exist, the preferred embodiment of the invention is arranged to permit the head of mercury to build up in one tank in proportion to the acceleration. Meanwhile, the consequent shift of the center of gravity is prevented by introducing into the high level and consequently heavy tank a light mercury-displacing body or float. In this way, the required acceleration head or gradient is built up without permitting flow of mercury between tanks, although the equivalent free flow of mercury between them for correcting error in the gyroscope is not interfered with to the slightest degree. The depth of insertion of the float into the mercury is predetermined in accordance with the factors which cause the disturbing acceleration, namely, ship speed and change of course, this measurement being made in a computer of any suitable type. Finally, cognizance is taken of practical limitations in such measurements at sea and a novel mechanism provided to prevent over-correction from this cause.

It will be seen that the new mercury ballistic erecting system for a gyroscope stable element provides a very simple but effective arrangement for correcting the frequent acceleration effects that occur because of the evasive maneuvers of modern naval combat vessels and without disabling and thus depriving the gun-fire control system of a stable element at critical times, so that it may be fairly said that the invention permits the mercury system to operate about the virtual or apparent vertical while the gyroscope indicates the true vertical.

For a more complete understanding of the invention, reference may be had to the accompanying drawings, in which:

Figure 1 is an elementary diagram of a mercury tank and pipe assembly when level and not under acceleration;

Fig. 2 is a similar view of the assembly when tilted down at the left, but not under acceleration;

Fig. 3 is a similar view when not tilted but under acceleration and not corrected therefor;

Fig. 4 is a similar view when not tilted, but under acceleration and corrected by the system of this invention.

Figure 5:
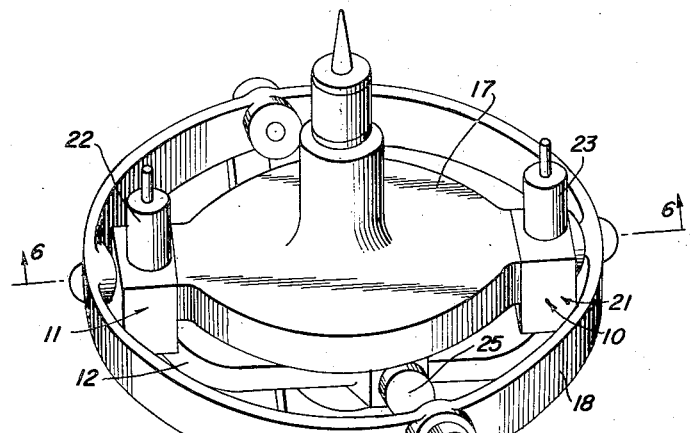
Fig. 5 illustrates in perspective a practical assembly of the sensitive unit of a stable element of well-known type with the system of this invention applied thereto.

Fig. 7 schematically illustrates an electrical arrangement for determining corrections in the system of this invention.

Referring to Fig. 1, there is shown in diagrammatic form an assembly consisting of a tank 10 joined to a similar tank 11 by a bottom connecting pipe 12. Liquid, preferably mercury, is contained in the two tanks and the connecting pipe and when, as in this figure, the system is level the height of the mercury is the same in both tanks. For this reason the center of gravity of the liquid is the midpoint 13 on the vertical line of symmetry 14 and the system is in equilibrium.

Assume that all conditions remain unchanged, except that, owing to some disturbance, such as a tilt downwardly to the left as shown in Fig. 2, there is more mercury in the left-hand tank 11 than in the right-hand tank 10, so that the center of gravity of the mercury has shifted to the left to the point 13'. The system is therefore unbalanced and a force-couple appears of the dimension $R_t$ as indicated. If the tank system is rotated bodily about the vertical median line 14 as an axis, then when it is unbalanced as in Fig. 2, the force-couple $R_t$ will not appear in the plane of the tanks, but in some plane at an angle to them, due to phase displacement of the mercury flow.

This phenomenon is well known and is commonly used to keep a gyroscope in the vertical, the constants of the system being chosen in such relation to the speed of rotation that the couple $R_t$, used to erect the gyroscope upon departure from the vertical in the plane of the drawing, appears in a plane roughly perpendicular to that plane. By such means a gyroscope is made to keep the vertical within two minutes of angle, if stationary or if traveling in a straight line at uniform speed. However, when these conditions are not met, the gyroscope starts to align with the virtual vertical with loss of value as a stable element, thus introducing a serious error difficult to detect promptly. This condition is corrected in the system of the present invention, as will be explained in connection with Figs. 3 and 4.

Referring to Fig. 3, the same tank and tube assembly is shown in horizontal position but subjected to acceleration in the direction of the arrow ACC, thus causing mercury transfer in the opposite direction resulting in a gradient in the mercury level amounting, from one end to the other, to the head indicated at $h$. Inasmuch as the quantity of the mercury in tank 11 is greater than that in tank 10, a force-couple of the value $R_a$ appears, as shown, although the assembly has remained on even keel. Due to the resulting unbalance, a powerful but erroneous correction is imposed on the associated gyroscope for a departure from the vertical which has actually not occurred. Thus the gyroscope will be over-corrected and a serious error created. The system, of course, is indifferent to origin of disturbances and cannot distinguish between gravity and acceleration forces.

Fig. 4 illustrates the novel arrangement whereby the mercury level gradient is permitted to satisfy the acceleration, while any unbalance of the system because of the acceleration is prevented. This is accomplished by introducing into the mercury in the overloaded tank 11 a light liquid-displacing member 15 of any desired shape, to such a depth that the total amount of mercury in tank 11 is made equal to the total amount in the other tank 10. This displacement immersion depth is determined by mathematical calculation from known factors, such as speed of ship, rate of change of course and displacement rate of the introduced float. Should the acceleration be in the opposite direction, a similar float 16 is introduced into the other tank 10. The means for effecting automatic control of the position of the floats will be made clear later.

Figure 6:
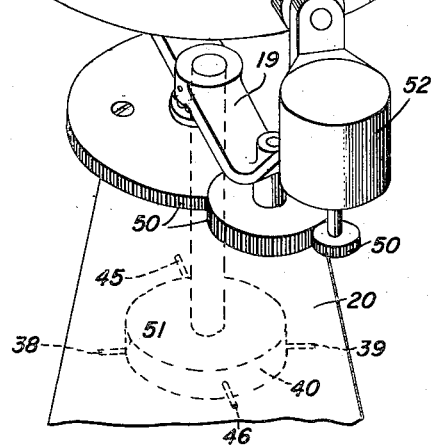
Fig. 6 shows the mercury system of Fig. 5 in enlarged vertical section.
Figure 6:
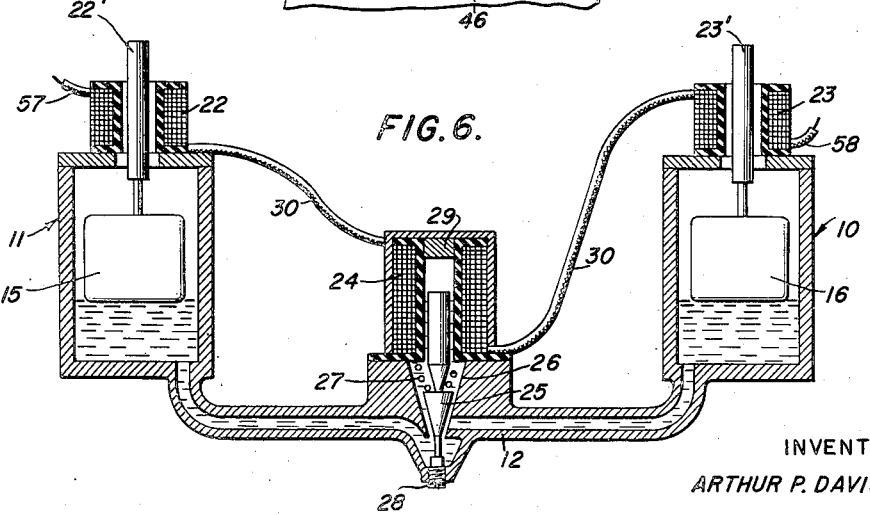

Referring to Fig. 5, illustrating a preferred embodiment of the invention as applied to a well-known stable element gyroscope assembly, the encased gyroscope 17 is mounted in the gimbal 18 which in turn is mounted for slow rotation in the fork 19 on the follow-up or phantom element 20 and driven by the motor 52. Carried on the gyroscope 17 is the connected mercury tank assembly 21 similar to that shown in Fig. 1 and shown in enlarged section in Fig. 6, by means of which the gyroscope 17 is kept substantially vertical, as above described. Mounted on the mercury tanks 10 and 11 are respective solenoids 23 and 22 whose permanent magnet armatures 23' and 22' are connected to the corresponding mercury displacement floats 15 and 16 for operating the same in the manner previously described in connection with Figs. 3 and 4. The mercury is indicated as completely filling the connecting pipe 12 and partially filling the tanks 10 and 11.

At the center of pipe 12 is shown in diagrammatic form the flow control valve 25 operated by solenoid 24. The whole device is shown on even keel so that the level of the mercury is the same height in both tanks. When this is the case, the mercury has no effect on the gyroscope, since such a condition shows that the gyroscope has the desired orientation. The constriction in the pipe 12 is provided by the conical valve 25 cooperating with the conical seat 26. Valve 25 is held by spring 27 in a predetermined position against the adjusting screw 28 for normal operation in correcting the gyroscope when not affected by acceleration. When solenoid 24 is energized in response to acceleration, it pulls the armature 29 and connected valve 25 away from the screw 28, which action, due to the conical shape of the valve 25 and its seat 26, progressively reduces the constriction in the pipe 12, thus permitting freer flow of the mercury. This action reduces the speed of erection of the gyroscope, when the same is too high, due for instance, to error in calculated applied corrective values.

Referring to Fig. 7 which illustrates the electrical mercury system control circuit and means to apply corrective forces to the gyroscope, the mercury displacing floats 15 and 16 are shown diagrammatically with their permanent magnet armatures 22' and 23' arranged NS, SN within their operating coils 22 and 23. The armature 29 of the flow-rate controlling valve 25 is not magnetized like armatures 22' and 23', but is of soft iron, so that it is pulled into the solenoid 24 as a function of the current strength in coil 24, regardless of the direction of the current. However, coils 22 and 23, although connected in series with coil 24 by wires 30, have opposite polarity armatures 22' and 23', so that one float goes down when the other goes up. Such an arrangement is a preferred means of causing the appropriate float to operate according to direction of the acceleration force. The depth to which a float should be immersed for any given acceleration is a matter of calculation and is readily controlled by apparatus now to be described.

Two forms of acceleration are in evidence on a ship, firstly, simple acceleration in the fore-and-aft plane of the ship due to changes in speed, and, secondly, athwartship acceleration due to rapid turns or excessive rolling if the stable element is not mounted low in the ship. To calculate these accelerations the means illustrated in Fig. 7 are employed and comprise direct current generators 31 and 32 for producing voltages proportional to, firstly, the rate of change of speed of the ship, and secondly, the centrifugal force due to change of course. Other small accelerations are neglected as immaterial, since the main accelerations cannot be accurately determined, due to inaccuracy in estimating ship's speed, for instance, among the other factors.

The field of direct current generator 31 is energized by battery 33 and its armature is driven by the speed indication shaft 34 of the tachometer 35 which is driven by the propeller shaft 36 of the ship, as shown. In this way, the voltage output $$\frac{dS}{dt}$$

of generator 31 across the leads 37, is proportional to the rate of change of speed of the ship, i. e., fore-and-aft acceleration. This voltage is applied to the diametrically opposite points 38 and 39 on the circular voltage divider 40. The winding of the voltage divider 40 is secured to the supporting frame 20 and is electrically insulated therefrom.

The acceleration force due to changing course is represented by the voltage output of the second direct current generator 32, whose winding is energized by the voltage value S proportional to ship's speed, by means of the wires 41 from direct current generator 42 driven from propeller shaft 36 as shown. The armature of generator 32 is driven by a compass repeater 43, in accordance with course, C, as shown. The output voltage of generator 32 of value S $$\frac{dC}{dt}$$

is impressed by leads 44 connected to diametrically opposite points 45 and 46 on the winding of the voltage divider 40, these points being at right angles to the points 38, 39, since the two accelerations occur in planes at right angles to each other.

The winding of voltage divider 40 is engaged by a pair of opposite sliders 47 and 48 which rotate together with their mounting hub 49, being driven through gearing 50, fork 19, and shaft 51 from the gimbal rotation motor 52, as shown in Fig. 5. Sliders 47 and 48 rotate with hub 49, and are connected by wires 57 and 58 to one terminal each of coils 22 and 23, respectively, whose other terminals are connected together by wire 30 including the coil 24.

In operation of the stable element control of this invention, as the gyroscope 17 and the mercury system 21 are rotated by motor 52 substantially in the horizontal plane, the voltage divider 40 feeds voltages to the solenoids 22, 23 and 24 from the various calculators, and the factors are properly combined by rotation of the member 49 with the gyroscope 17 to oscillate the floats 15 and 16 for varying and periodically reversing the mercury head in the tanks 11 and 10 due to any acceleration present. This artificial reversing of the mercury head in tanks 10 and 11, counter to the acceleration mercury heads, is controlled by the voltage divided 40, which determines at what point in the rotation of the mercury system 21 the acceleration effects due to speed changes or those due to changes in course are adversely affecting the mercury system so that the proper degree of correction must be applied, which is also determined.

As stated, effects due to changes in speed, occurring substantially fore-and-aft, are proportional to the voltage developed in generator 31 and that voltage is impressed across an equivalent 180° segment 38, 39 of voltage divider 40, whereas the voltage proportional to acceleration due to changes in course, occurring substantially athwartships and developed in generator 32, is impressed across an equivalent 180° segment 45, 46 of divider 40 and displaced 90° from the speed change segments.

The voltage picked up by brushes 47 and 48, almost invariably the sum of speed change acceleration and course change acceleration voltages in varying proportions depending upon the angular positions of the brushes, determines the depth of immersion of the floats 15 and 16 in the mercury in corresponding tanks 11 and 10, float 15 being raised when float 16 is depressed, and vice versa, as explained. Since the voltage output of the divider 40 is proportional to the effects of acceleration on the mercury at the instantaneous angle of rotation thereof by motor 52, the immersion of the floats 15 and 16 is proportional to the rise or fall of the mercury in the corresponding tanks due to acceleration at that instant. Hence, the displacement mechanism provides a difference in head of mercury in the tanks which is substantially proportional to acceleration, and permits only sufficient unequal volume of mercury in the tanks to cause precession of the gyroscope back to the vertical upon departure therefrom.

The net result of this arangement is that, when the ship is on even keel and an acceleration occurs, the mercury, due to the acceleration, tends to build up in the tank 11 as indicated in Figs. 3 and 4, but the float 15 in that tank immerses sufficiently to prevent transfer of mercury to that tank from the other one, thus itself creating a head in the tank proportional to the acceleration. In other words, the float is immersed in the mercury in the tank to a depth just enough to build up the necessary head in the annular small space about it, thus preventing admission of mercury and preserving the balance of the system. Nevertheless, actual unbalance can still cause the mercury to flow for correction of the gyroscope.

Finally, due to the solenoid 24, as the acceleration voltages increase, the valve 25 opens more and more, reducing the effect of the mercury on the gyroscope, in order not to over-correct the same as previously explained.

Although a preferred embodiment of this invention has been described herein, many variations of the same may be employed to obtain the same effects. For instance, the whole mercury tank system 21 may be pivoted on the gyroscope case and oscillated with accelerations in such a way that it is caused to rotate about the virtual vertical, rather than about the true vertical, or equivalent flexible diaphragms in the tanks may be inflated or advanced by compressed air, for instance, to control the mercury. Accordingly the invention should be measured by the following claims rather than by the specific embodiment disclosed herein.

I claim:

1. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system continuously about a substantially vertical axis, the combination of means responsive to acceleration of the gyroscope support, mechanism for regulating the displacement of the liquid in said system in response to said acceleration while permitting substantially free flow of the liquid between said communicating receptacles, and operative connections between said means and said mechanism for compensating for the effect of acceleration on said system.

2. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support, counter-displacement mechanism including a member immersible in the liquid in each receptacle for increasing the head of liquid therein, and operative connections between said means and said mechanism for effecting the immersion of said members in the corresponding receptacles.

3. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system continuously about a substantially vertical axis, the combination of means responsive to acceleration of the gyroscope support, mechanism for regulating the displacement of the liquid in said system in response to said acceleration while permitting substantially free flow of the liquid between said communicating receptacles, operative connections between said means and said mechanism for compensating for the effect of acceleration on said system, and means responsive to the angle of rotation of said system interposed in the connections between said first means and said mechanism for controlling the degree of said displacement regulation in accordance with the degree of the acceleration effect on said system at said angle.

4. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support, counter-displacement mechanism including a member immersible in the liquid in each receptacle for increasing the head of liquid therein, operative connections between said means and said mechanism for effecting the immersion of said members in the corresponding receptacles, and means responsive to the angle of rotation of said system interposed in the connections between said first means and said mechanism for controlling the degree of said displacement regulation in accordance with the degree of the acceleration effect on said system at said angle.

5. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support, mechanism for regulating the displacement of the liquid in said system in response to said acceleration, operative connections between said means and said mechanism for compensating for the effect of acceleration on said system, second mechanism for regulating the flow of the liquid through the communication between said receptacles during said acceleration displacement thereof, and operative connections between said means and said second mechanism for modifying the response of said liquid to said acceleration.

6. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support, mechanism for regulating the displacement of the liquid in said system in response to said acceleration, operative connections between said means and said mechanism for compensating for the effect of acceleration on said system, means responsive to the angle of rotation of said system interposed in the connections between said first means and said mechanism for controlling the degree of said displacement regulation in accordance with the degree of the acceleration effect on said system at said angle, second mechanism for regulating the flow of the liquid through the communication between said receptacles during said acceleration displacement thereof, and operative connections between said means and said second mechanism for modifying the response of said liquid to said acceleration.

7. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support, counter-displacement mechanism including a member immersible in the liquid in each receptacle for regulating the displacement of liquid therein, operative connections between said means and said mechanism for effecting the immersion of said members in the corresponding receptacles, means responsive to the angle of rotation of said system interposed in the connections between said first means and said mechanism for controlling the degree of said displacement regulation in accordance with the degree of the acceleration effect on said system at said angle, second mechanism for regulating the flow of the liquid through the communication between said receptacles during said acceleration displacement thereof, and operative connections between said means and said second mechanism for modifying the response of said liquid to said acceleration.

8. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system continuously about a substantially vertical axis, the combination of means responsive to acceleration of the gyroscope support in one direction, mechanism for regulating the displacement of the liquid in said system in response to said acceleration while permitting substantially free flow of the liquid between said communicating receptacles, operative connections between said means and said mechanism for compensating for the effect of acceleration on said system, and means responsive to the angle of rotation of said system interposed in said connections for controlling said mechanism in accordance with the effect of said acceleration in said direction on said system at said angle.

9. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support in one direction, counter-displacement mechanism including a member immersible in the liquid in each receptacle for increasing the head of liquid therein, operative connections between said means and said mechanism for effecting the immersion of said members in the corresponding receptacles, and means responsive to the angle of rotation of said system interposed in said connections for controlling said mechanism in accordance with the effect of said acceleration in said direction on said system at said angle.

10. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system continuously about a substantially vertical axis, the combination of means responsive to acceleration of the gyroscope support in a plurality of different directions, mechanism for regulating the displacement of the liquid in said system in response to said acceleration while permitting substantially free flow of the liquid between said communicating receptacles, operative connections between said means and said mechanism for compensating for the effect of acceleration on said system, and means responsive to the angle of rotation of said system interposed in said connections for selectively controlling said mechanism in accordance with the effect of said acceleration affecting said system in the direction of orientation of the latter.

11. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support for developing a voltage proportional thereto, electro-mechanical mechanism for regulating the displacement of the liquid in said system in response to said acceleration, and operative connections between said acceleration responsive means and said mechanism for compensating for the effect of acceleration on said system.

12. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support for developing a voltage proportional thereto, electro-mechanical mechanism for regulating the displacement of the liquid in said system in response to said acceleration, operative connections between said acceleration responsive means and said mechanism for compensating for the effect of acceleration on said system, and means responsive to the angle of rotation of said system interposed in said connections for regulating the voltage impressed on said mechanism in accordance with the degree of acceleration effect on said system at said angle.

13. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support for developing a voltage proportional thereto, electro-mechanical mechanism for regulating the displacement of the liquid in said system in response to said acceleration, operative connections between said acceleration responsive means and said mechanism for compensating for the effect of acceleration on said system, and a voltage divider interposed in said connections for regulating the voltage impressed on said mechanism in accordance with the degree of acceleration effect on said system in the direction of orientation of the latter, the voltage output of said voltage divider being dependent upon the angular position of the rotatable gyroscopic support.

14. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support in one direction, second means responsive to acceleration of the gyroscope support in another direction, electro-mechanical mechanism for regulating the displacement of the liquid in said system in response to said acceleration, operative connections between said first and second acceleration responsive means and said mechanism for compensating for the effect of acceleration on said system, and a voltage divider providing an output in accordance with the rotation of said gyroscope support interposed in said connections for selectively regulating the voltage impressed on said mechanism in accordance with the degree of acceleration effects in said directions on said system at any angle of orientation thereof.

15. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support in a plurality of different directions, counter-displacement mechanism including a member immersible in the liquid in each receptacle for regulating the displacement of liquid therein, operative connections between said acceleration responsive means and said mechanism for effecting the immersion of said members in the corresponding receptacles, and means responsive to the angle of rotation of said system interposed in said connections for selectively controlling said mechanism in accordance with the effect of said acceleration affecting said system in the direction of orientation of the latter.

16. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support for developing a voltage proportional thereto, electromechanical counter-displacement mechanism including a member immersible in the liquid in each receptacle for regulating the displacement of liquid therein, operative connections between said acceleration responsive means and said mechanism for effecting the immersion of said members in the corresponding receptacles, and means responsive to the angle of rotation of said system interposed in said connections for regulating the voltage impressed on said mechanism in accordance with the degree of acceleration effect on said system at said angle.

17. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support for developing a voltage proportional thereto, electromechanical counter-displacement mechanism including a member immersible in the liquid in each receptacle for regulating the displacement of liquid therein, operating connections between said acceleration responsive means and said mechanism for effecting the immersion of said members in the corresponding receptacles, and a voltage divider providing an output in accordance with the rotation of said gyroscope support interposed in said connections for regulating the voltage impressed on said mechanism in accordance with the degree of acceleration effect on said system in the direction of orientation of the latter.

18. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support in one direction, second means responsive to aceceleration of the gyroscope support in another direction, electro-mechanical counter-displacement mechanism including a member immersible in the liquid in each receptacle for regulating the displacement of liquid therein, operative connections between said first and second acceleration responsive means and said mechanism for effecting the immersion of said members in the corresponding receptacles, and a voltage divider providing an output in accordance with the rotation of said gyroscope support interposed in said connections for selectively regulating the voltage impressed on said mechanism in accordance with the degree of acceleration effects in said direction on said system at any angle of orientation thereof.

19. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support for developing a voltage proportional thereto, counter-displacement mechanism for each receptacle for regulating the displacement of liquid introduced therein in response to said acceleration, electrical motive means connected to each mechanism for operating the same, electrical connections between said acceleration responsive means and each motive means, and a voltage divider providing an output in accordance with the rotation of said gyroscope support interposed in said connections for regulating the voltage impressed on each motive means in accordance with the degree of acceleration effect on said system in the direction of orientation of the latter to thereby proportionally regulate the degree of counter-displacement of the liquid.

20. In a stable element having a universally supported vertical axis gyroscope, an erecting system thereon including a pair of communicating receptacles mounted at opposite sides of the gyroscope and containing a liquid displaceable in response to acceleration of the gyroscope support, and means for rotating said gyroscope support and system about a substantially vertical axis, the combination of means responsive to acceleration of the gyroscope support for developing a voltage proportional thereto in one predetermined direction, second means responsive to acceleration of said support in another predetermined direction for developing a voltage proportional thereto, counter-displacement mechanism for each receptacle for regulating the displacement of liquid introduced therein in response to said acceleration, electrical motive means connected to each mechanism for operating the same, a voltage divider providing an output in accordance with the rotation of said gyroscope support and having taps arranged in said relative directions and connected to the corresponding first and second means, and opposite brushes on said divider connected to corresponding motive means for regulating the voltage impressed on each motive means in accordance with the degree of acceleration effect on said system in the direction of orientation of the latter to thereby proportionally regulate the degree of counter-displacement of the liquid.

ARTHUR P. DAVIS.

REFERENCES CITED

The following references are of record in the file of this patent:

UNITED STATES PATENTS

| Number | Name | Date |
|---|---|---|
| 1,644,921 | Henderson | Oct. 11, 1927 |
| 1,866,706 | Henderson | July 12, 1932 |
| 1,887,318 | Mahoney | Nov. 8, 1932 |
| 1,923,290 | Wood | Aug. 22, 1933 |
| 2,087,961 | Anscott | July 27, 1939 |

FOREIGN PATENTS

| Number | Country | Date |
|---|---|---|
| 13,280 | Great Britain | 1915 |
| 125,660 | Great Britain | May 1, 1919 |